(12) United States Patent
Gorman

(10) Patent No.: US 6,396,490 B1
(45) Date of Patent: May 28, 2002

(54) EFFICIENT REPRESENTATION OF CONNECTIVITY INFORMATION IN PROGRESSIVE MESH UPDATE RECORD

(75) Inventor: Christopher L. Gorman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/205,827

(22) Filed: Dec. 4, 1998

(51) Int. Cl.$^7$ ............................................... G06T 15/00
(52) U.S. Cl. ...................................................... 345/419
(58) Field of Search ................................. 345/419, 440, 345/428, 619, 660

(56) References Cited

U.S. PATENT DOCUMENTS 5,905,507 A * 5/1999 Rossignac et al. .......... 345/440
6,002,803 A * 12/1999 Qian et al. .................. 382/242

* cited by examiner

*Primary Examiner*—Phu K. Nguyen
(74) *Attorney, Agent, or Firm*—Blakely, Sokoloff, Taylor & Zafman LLP

(57) ABSTRACT

The present invention is a method and apparatus for representing a connectivity of an object, which has N vertices, in a pair-contracting operation. A parent vertex is encoded in the N vertices. The parent vertex is used in the pair-contracting operation. A symbol of the connectivity related to the parent vertex is encoded.

35 Claims, 12 Drawing Sheets

EFFICIENT REPRESENTATION OF CONNECTIVITY INFORMATION IN PROGRESSIVE MESH UPDATE RECORD

BACKGROUND

1. Field of the Invention

This invention relates to computer systems. In particular, the invention relates to data representation for media information.

2. Description of Related Art

Progressive mesh (PM) representation is a scheme for representing highly detailed three-dimensional (3-D) graphic models at continuous resolutions. The graphic models are usually tessellated into polygonal approximations, referred to as meshes. In many simplified models, the polygons are triangles.

Progressive meshes are typically based on pair-contraction, vertex decimation, or edge collapse operations. Pair contraction is based on the iterative contraction of vertex pairs. Vertex decimation iteratively selects a vertex for removal, removes all adjacent faces, and retriangulates the resulting hole. Edge collapse unifies two adjacent vertices into a single vertex according to a selected sequence of transformations.

Among these techniques, pair contraction provides several advantages. The primary advantage is the ability to join previously unconnected regions of the model together. The technique is therefore less sensitive to the mesh connectivity of the original model.

However, the implementation of the pair-contraction technique has a number of disadvantages. The technique represents models using an adjacency graph structure: vertices and faces are all explicitly represented and linked together. Edges may also be derived from vertices and faces. The representation typically enumerate surrounding vertices based on position and encode the connectivity in terms of this ordering. The amount of encoded representation is large and therefore results in inefficient compression.

Therefore, there is a need in the technology to provide a simple and efficient method to represent connectivity in progressive meshes.

SUMMARY

Briefly, in one embodiment, the present invention is a method for representing a connectivity of an object, having N vertices, in a pair-contracting operation. The method comprises (i) encoding a parent vertex in the N vertices, the parent vertex being used in the pair-contracting operation, and (ii) encoding a symbol of the connectivity related to the parent vertex.

BRIEF DESCRIPTION OF THE DRAWINGS

The features and advantages of the present invention will become apparent from the following detailed description of the present invention in which.

DESCRIPTION

The present invention is a method and apparatus for representing connectivity in progressive meshes. A child vertex connectivity is represented in terms of faces and vertices connected to a parent vertex. The encoding of the representation is simple and efficient, resulting in reduction in data storage, processing time, and high compression rate.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
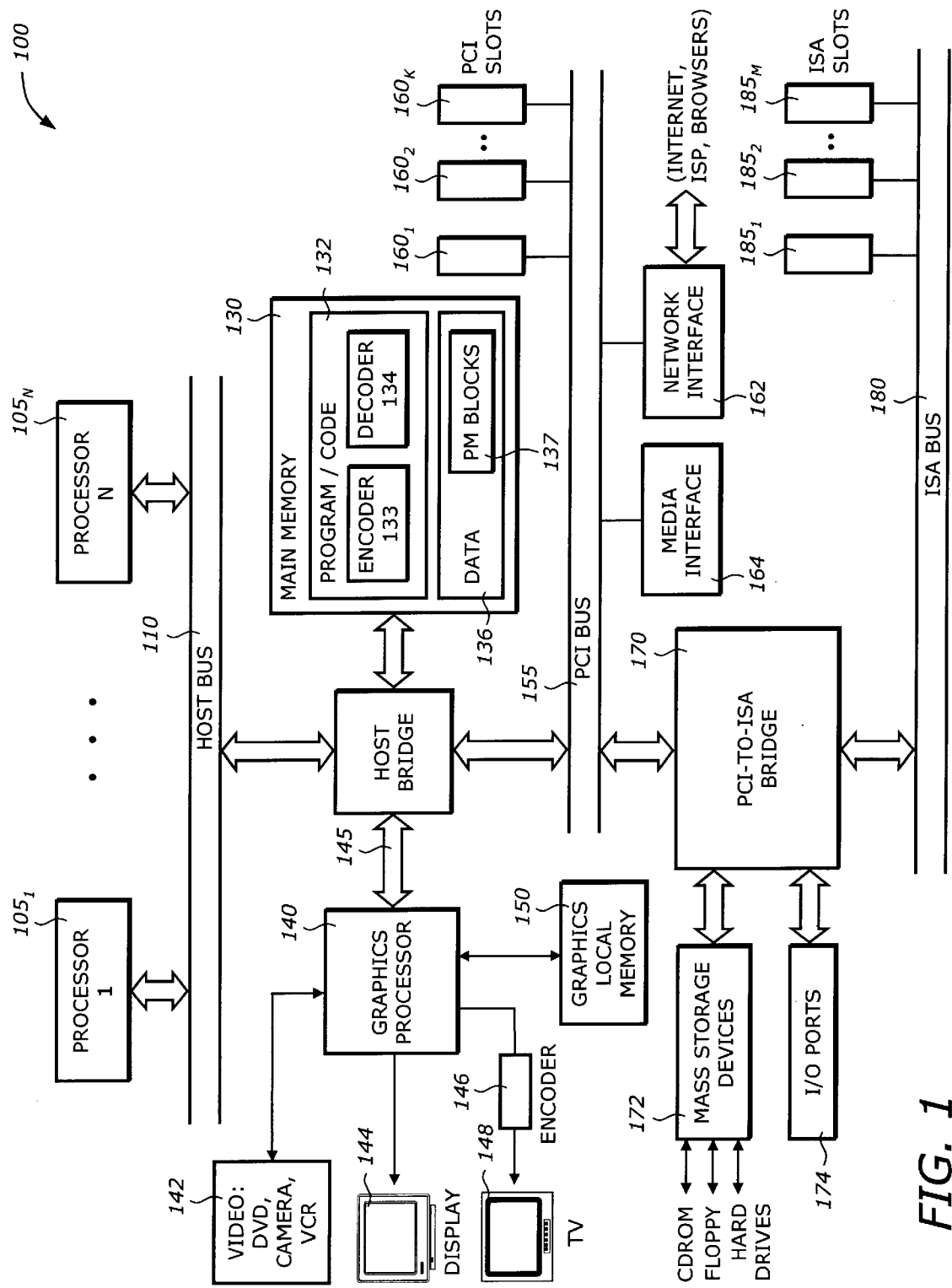
FIG. 1 is a diagram illustrating a computer system in which one embodiment of the invention can be practiced.

FIG. 1 is a diagram illustrating a computer system 100 in which one embodiment of the invention can be practiced. The computer system 100 includes N processors $105_1$ through $105_N$, a host bus 110, a host bridge 120, a main memory 130, a graphics processor 140, a video device 142, a display monitor 144, a television (TV) 148, an encoder 146, a graphics local memory 150, a PCI bus 155, K PCI slots $160_1$ to $160_K$, a PCI-to-ISA bridge 170, mass storage devices 172, Input/Output (I/O) ports 174, an ISA bus 180, and ISA slots $185_1$ to $185_M$.

Each of the processors $105_1$ to $105_N$ represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge 120 includes a number of interface circuits to allow the host processors $105_1$ to $105_N$ access to the main memory 130, the graphics processor 140, and the PCI bus 155. The main memory 130 represents one or more mechanisms for storing information. For example, the main memory 130 may include non-volatile or volatile memories. Examples of these memories include flash memory, read only memory (ROM), or random access memory (RAM). The main memory 130 has stored therein program code 132 and data 136. The program code 132 represents the necessary code for performing a specified task. In one embodiment, the program code includes an encoder 133 and a decoder 134. The encoder 133 compresses a progressive meshes (PM) stream. The decoder 134 decompresses a compressed PM stream. The data 136 stores data used by the program code 132, graphics data and temporary data. In one embodiment, the data 136 includes the update records of the PM blocks. Of course, the main memory 130 preferably contains additional software (not shown), which is not necessary to understanding the invention.

When implemented in software, the elements of the encoder 133 and decoder 134 are essentially the code segments or operational acts in the compressing and decompressing processes, respectively. The program or code segments can be stored in a processor readable medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc. The PCI slots $160_1$ to $160_K$ provide interfaces to PCI devices. Examples of PCI devices include a network interface 162 and a media interface 164. The network interface 162 connects to communication channel such as the Internet. The Internet provides access to on-line service providers, Web browsers, and other network channels. The media interface 164 provides access to audio and video devices.

The graphics processor 140 is a high performance graphics controller that perform graphics functions such as 3-D rendering operations, progressive meshes, painting, drawing, etc. The graphics processor 140 is coupled to the host bridge 120 via a graphics bus 145. In one embodiment, the graphics bus 145 possesses and the Accelerated Graphics Port (AGP) architecture developed by Intel Corporation of Santa Clara, Calif. The graphics processor 140 has access to its own graphics local memory 150. The graphic local memory 150 may contain graphics programs and data for processing progressive mesh blocks. The video device 142 provides video input such as DVD, camera, or video cassette recorder (VCR) to the graphics processor 140. The display monitor 144 displays the graphics as generated by the graphics processor 140. The encoder 146 receives the graphics data from the graphics controller 140 and encodes into an analog signal to be compatible for TV display on the TV set 148.

The PCI-to-ISA bridge provides access to the ISA bus 180, mass storage devices 172, and I/O ports 174. The mass storage devices 172 include CD ROM, floppy diskettes, and hard drives. The ISA bus 180 has a number of ISA slots $185_1$ to $185_M$ to interface to ISA devices. Examples of ISA devices include data entry devices (e.g., keyboard, mouse), printers, etc.

Figure 2:
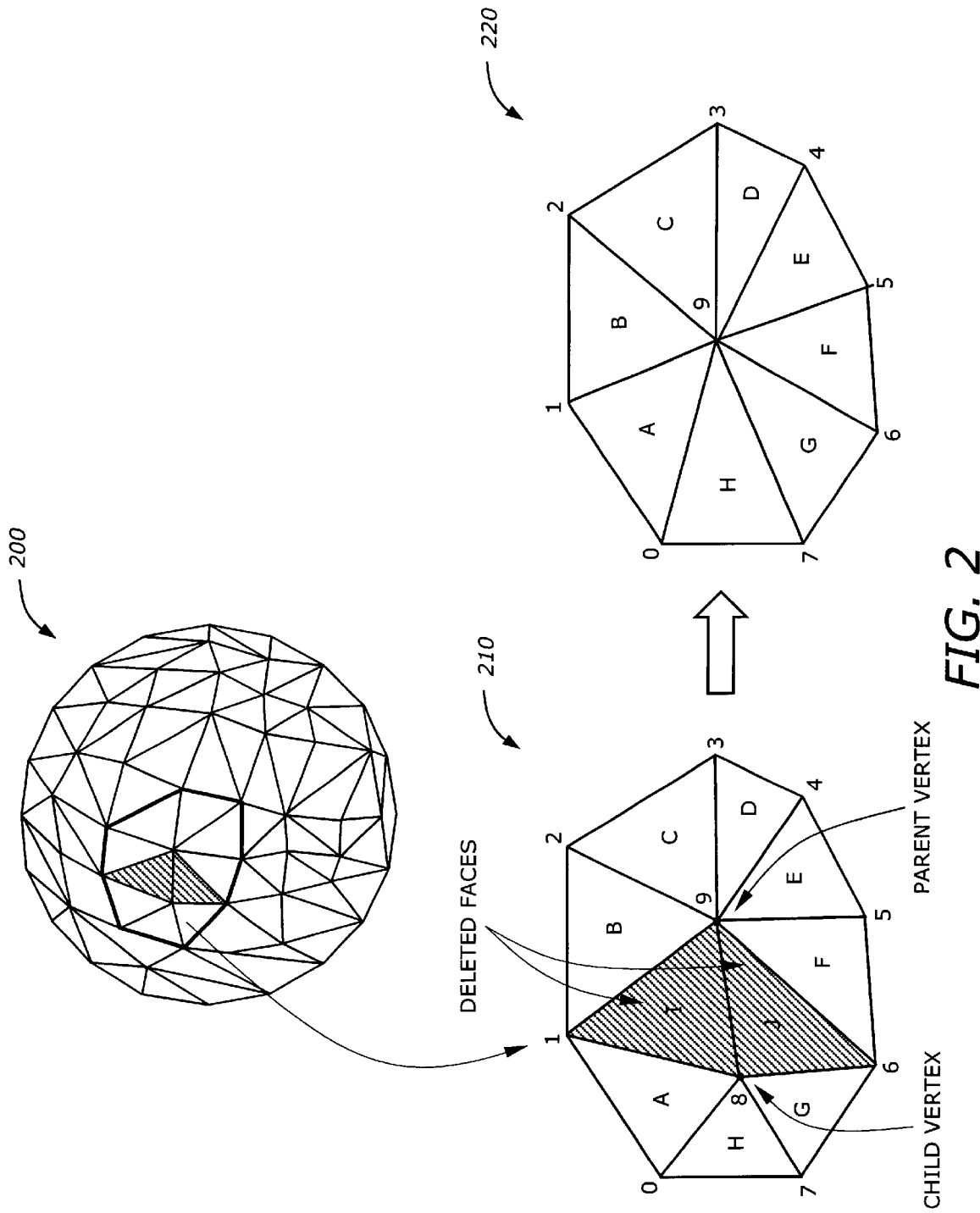
FIG. 2 is a diagram illustrating a pair-contraction operation according to one embodiment of the invention.

FIG. 2 is a diagram illustrating a pair-contraction operation according to one embodiment of the invention. The pair-contraction operation operates on an original patch 210 to produce a result patch 220 on an object 200.

The object 200 is a three-dimensional (3-D) object represented by polygonal meshes. As shown in FIG. 2, the polygons are triangles. As is known by one skilled in the art, the present invention is not limited to triangle meshes. The object 200 includes the original patch 210 on its surface.

The original patch 210 includes (i) faces a, b, c, d, e, f, g1 h, i, and j, and (ii) vertices 0, 1, 2, 3, 4, 5, 6, 7, 8, 9. The pair-contraction operation moves the vertex 8 to the vertex 9, and removes the degenerated faces i and j, The vertex 8 is referred to the "child vertex" and the vertex 9 is referred to as the "parent vertex". The result patch 220 has eight faces a, b, c, d, e, f, g, and h and nine vertices 0, 1, 2, 3, 4, 5, 6, 7, and 9. The child vertex 8 and the faces i and j are deleted. Faces a, h, and g are modified.

Figure 3:
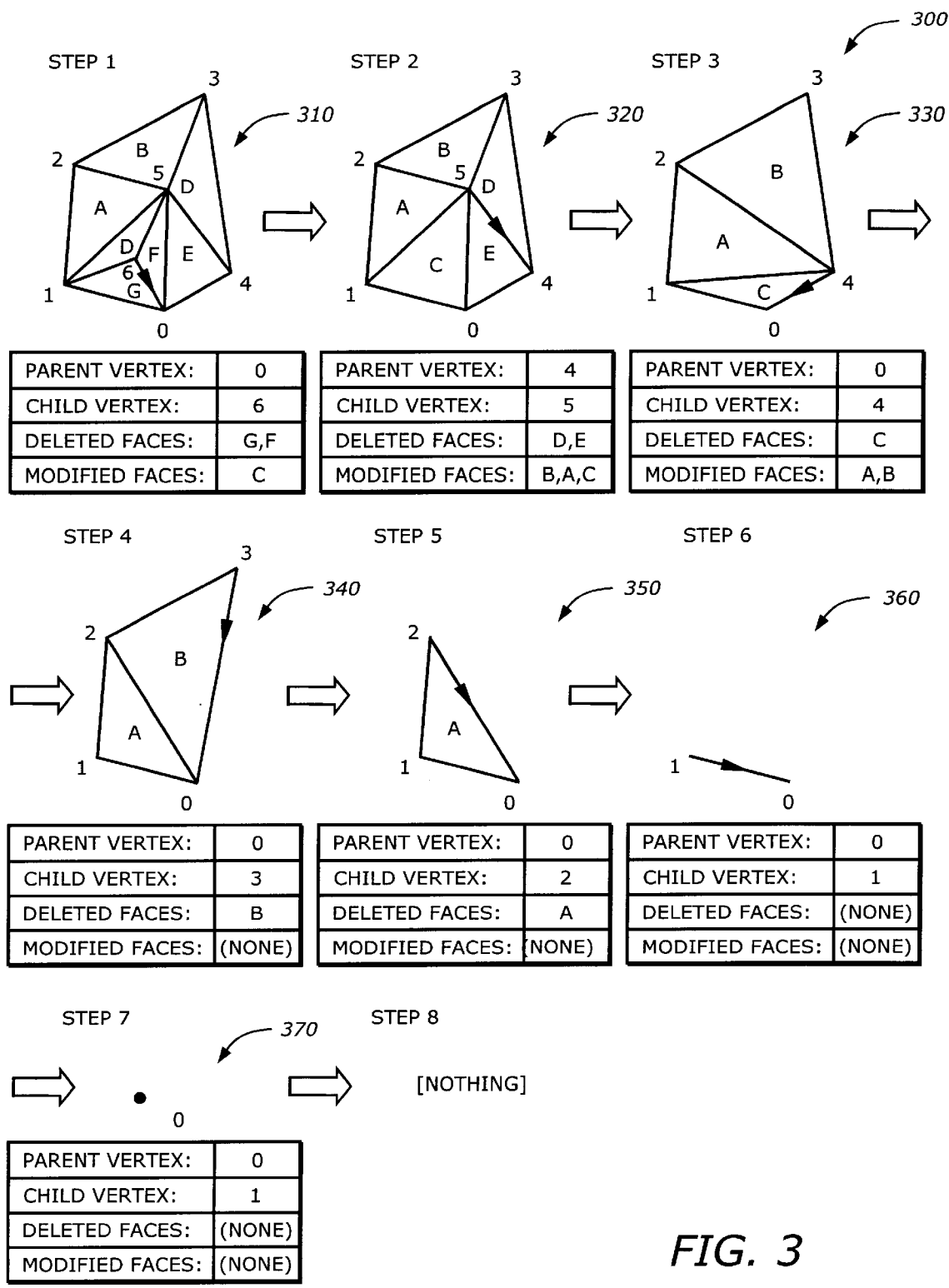
FIG. 3 is a diagram illustrating a mesh reduction sequence according to one embodiment of the invention.

FIG. 3 is a diagram illustrating a mesh reduction sequence 300 according to one embodiment of the invention. The mesh reduction sequence 300 includes a sequence of operational acts from act 1 through act 8. Acts 1–7 correspond to objects 310, 320, 330, 340, 350, 360, and 370, respectively.

In act 1, the object 310 includes seven vertices 0, 1, 2, 3, 4, 5, and 6, and seven faces a, b, c, d, e, f, and g. A pair-contraction operation is performed vertices 6 and 0. The parent vertex is 0, the child vertex is 6. After the operation, faces g and f are deleted, and face c is modified.

In act 2, the object 320 is the result of the pair-contraction operation in act 1. The object 320 includes six vertices 0, 1, 2, 3, 4, and 5, and five faces a, b, c, d, and e. A pair-contraction operation is performed on vertices 5 and 4. The parent vertex is 4 and the child vertex is 5. After the operation, faces d and e are deleted, and faces a, b, and c are modified.

In act 3, the object 330 is the result of the pair-contraction operation in act 2. The object 330 includes five vertices 0, 1, 2, 3, and 4, and three faces a, b, and c. A pair-contraction operation is performed on vertices 4 and 0. The parent vertex is 0 and the child vertex is 4. After the operation, face c is deleted, and faces a and b are modified.

In act 4, the object 340 is the result of the pair-contraction operation in act 3. The object 340 includes four vertices 0, 1, 2, and 3, and two faces a and b. A pair-contraction operation is performed on vertices 3 and 0. The parent vertex is 0 and the child vertex is 3. After the operation, face b is deleted, and no face is modified.

In act 5, the object 350 is the result of the pair-contraction operation in act 4. The object 350 includes three vertices 0, 1, and 2, and one face a. A pair-contraction operation is performed on vertices 2 and 0. The parent vertex is 0 and the child vertex is 2. After the operation, face a is deleted, and no face is modified.

In act 6, the object 360 is the result of the pair-contraction operation in act 5. The object 360 includes two vertices 0, and 1, and no face. A pair-contraction operation is performed on vertices 1 and 0. The parent vertex is 0 and the child vertex is 1. After the operation, no face is deleted, and no face is modified.

In act 7, the object 370 is the result of the pair-contraction operation in act 6. The object 370 includes one vertex 0, and no face. A pair-contraction operation is performed on vertex 0 to itself. The parent vertex is 0 and the child vertex is 0. After the operation, no face is deleted, and no face is modified.

In act 8, there is no object left as the result of the pair-contraction operation in act 7. No additional pair-contraction operation is performed.

Connectivity Inheritance Properties

A child's connectivity is defined as the vertices and faces that are connected to a child vertex. The child's connectivity becomes a part of, or is added to, its parent's connectivity in a single mesh reduction operation. A mesh operation is one act in the mesh reduction sequence as illustrated in FIG. 3. There are a number of properties associated with this connectivity characteristics.

Property 1: The parent inherits faces and vertex connections from its child.

When a face is modified, the new face is formed by replacing the child vertex index with its parent vertex index.

Figure 4:
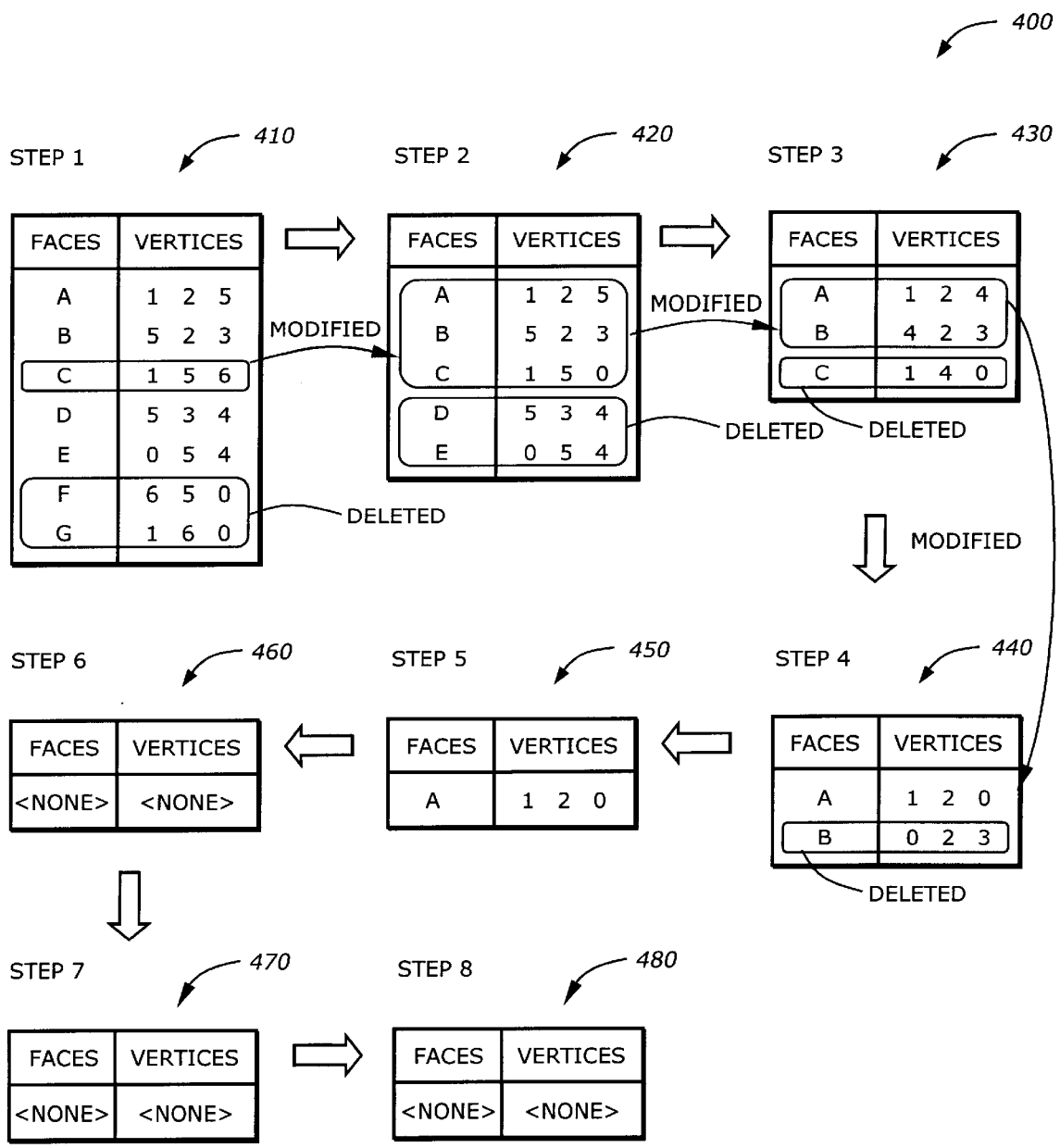
FIG. 4 is a diagram illustrating a data structure corresponding to the mesh reduction sequence in FIG. 3 according to one embodiment of the invention.

FIG. 4 is a diagram illustrating a data structure sequence 400 corresponding to the mesh reduction sequence in FIG. 3 according to one embodiment of the invention. The data structure sequence 400 includes the tables 410, 420, 430, 440, 450, 460, 470, and 480 corresponding to acts 1, 2, 3, 4, 5, 6, 7, and 8 (FIG. 3), respectively.

In act 1, the table 410 shows faces a, b, c, d, e, f, and g, which are formed by vertices <1, 2, 5>, <5, 2, 3>, <1, 5, 6>, <5, 3, 4>, <0, 5, 4>, <6, 5, 0>, and <1, 6, 0>, respectively. After the pair-contraction operation, face c is modified from <1, 5, 6> to <1, 5, 0>, and faces f and g are deleted. In the modified face c, the child vertex 6 is replaced by the parent vertex 0.

In act 2, the table 420 shows faces a, b, c, d, and e, which are formed by vertices <1, 2, 5>, <5, 2, 3>, <1, 5, 0>, <5, 3, 4>, and <0, 5, 4>, respectively. A the pair-contraction operation, faces a, b, and c are modified from <1, 2, 5>, <5, 2, 3>, <1, 5, 0> to <1, 2, 4>, <4, 2, 3>, <1, 4, 0>, respectively, and faces d and e are deleted. In the modified faces a, b, and c, the child vertex 5 is replaced by the parent vertex 4.

In act 3, the table 430 shows faces a, b, and c, which are formed by vertices <1, 2, 4>, <4, 2, 3>, and <1, 4, 0>, respectively. After the pair-contraction operation, faces a and b are modified from <1, 2, 4> and <4, 2, 3> to <1, 2, 0> and <0, 2, 3>, respectively, and face c is deleted In the modified faces a and b, the child vertex 4 is replaced by the parent vertex 0.

In act 4, the table 440 shows faces a and b, which are formed by vertices <1, 2, 0> and <0, 2, 3>, respectively. After the pair-contraction operation, no face is modified, and face b is deleted.

In act 5, the table 450 shows face a which is formed by vertices <1, 2, 0>. After the pair-contraction operation, no face is modified and no face is deleted.

In acts 6, 7, and 8, the tables 460, 470, and 480 show no faces and vertices left.

Mesh Building

Mesh building is the construction of a mesh from nothing, or a complex mesh from a simple mesh. Mesh building is carried out by reversing the acts in the mesh reduction sequence. Basically, the mesh building sequence needs only the parent vertex, the child vertex, the new faces, and the modified faces. This information is stored in an update record.

A face is modified by replacing the parent vertex index with the child vertex index in its vertices. As long as the parent vertex is specified and the child vertex is known, it is sufficient to represent the modified face changes simply by specifying which faces have to be modified.

Property 2: Modified faces (or delta faces) can be fully specified with only the parent vertex index, the child vertex index, and the modified face indices.

The new faces information in the update record has a similar property.

Figure 5A:
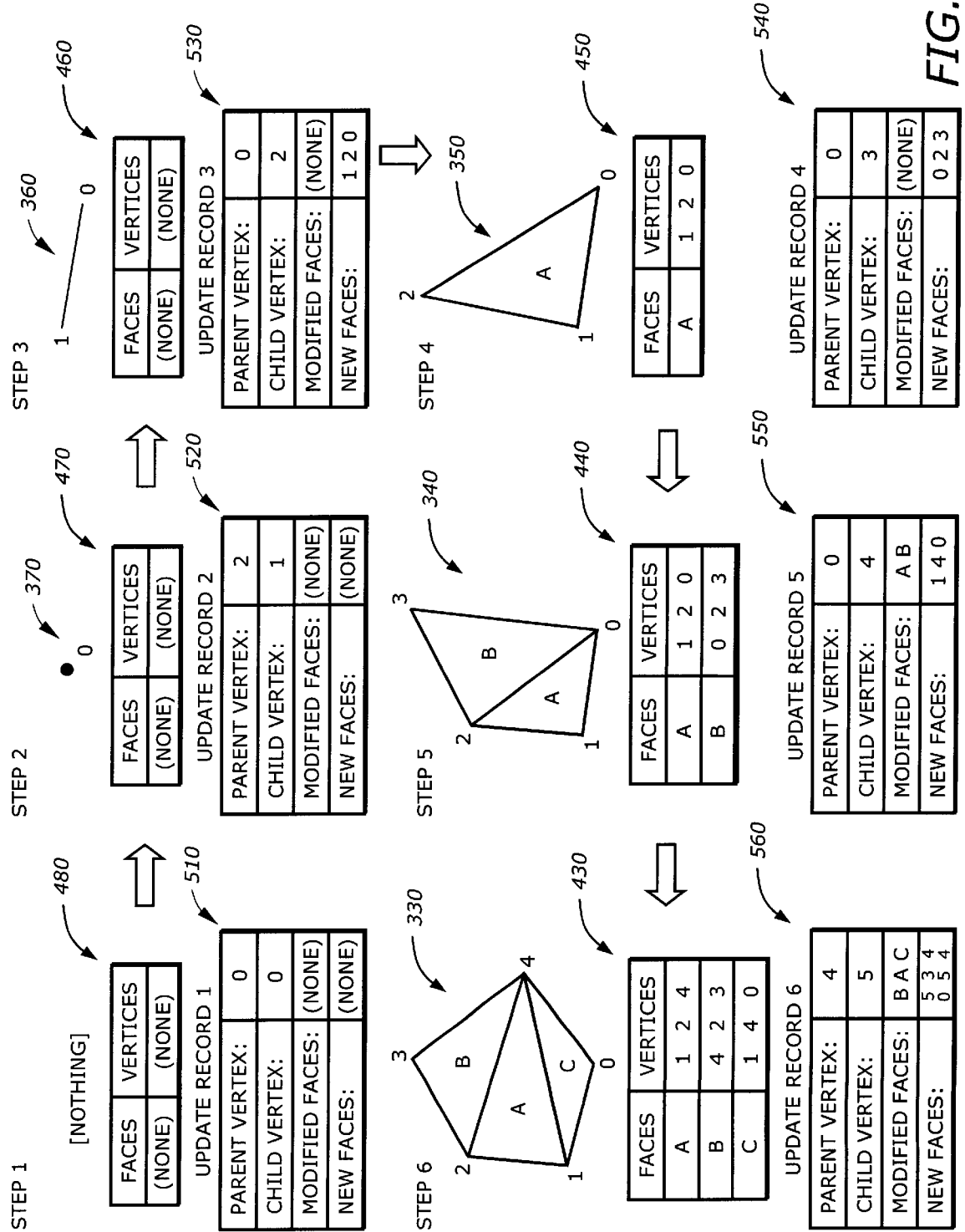
FIG. 5A is a diagram illustrating operational acts 1 through 6 in a mesh building sequence according to one embodiment of the invention.

FIG. 5A is a diagram illustrating acts 1 through 6 in a mesh building sequence 500 according to one embodiment of the invention. Acts 1 through 6 include update records 510 through 560, respectively.

In act 1, there is no object. The table 480 shows no face and no vertices. The update record 510, update record 1 (UR1), shows parent vertex 0, child vertex 0, no modified faces and no new faces.

In act 2, the object 370 is constructed. The table 470 shows no face and no vertices. The update record 520, update record 2 (UR2), shows parent vertex 0, child vertex 1, no modified faces and no new faces.

In act 3, the object 360 is constructed. The table 460 shows no face and no vertices. The update record 530, update record 3 (UR3), shows parent vertex 0, child vertex 2, no modified faces and new face formed by vertices <1, 2, 0>.

In act 4, the object 350 is constructed. The table 450 shows face a which is formed by vertices <1, 2, 0>. The update record 540, update record 4 (UR4), shows parent vertex 0, child vertex 3, no modified faces and new face formed by vertices <0, 2, 3>.

In act 5, the object 340 is constructed. The table 440 shows faces a and b, which are formed by vertices <1, 2, 0> and <0, 2, 3>, respectively. The update record 550, update record 5 (UR5), shows parent vertex 0, child vertex 4, modified faces a and b, and new face formed by vertices <1, 4, 0>. A face is modified by replacing the parent vertex with the child vertex. For example, face a formed by vertices <1, 2, 0> having parent vertex 0 and child vertex 4 is modified to <1, 2, 4>.

In act 6, the object 330 is constructed. The table 430 shows faces a, b, and c, which are formed by vertices <1, 2, 4>, <4, 2, 3>, and <1, 4, 0>, respectively. The update record 560, update record 6 (UR6), shows parent vertex 4, child vertex 5, modified faces a, b, and c, and new faces formed by vertices <5, 3, 4> and <0, 5, 4>.

Figure 5B:
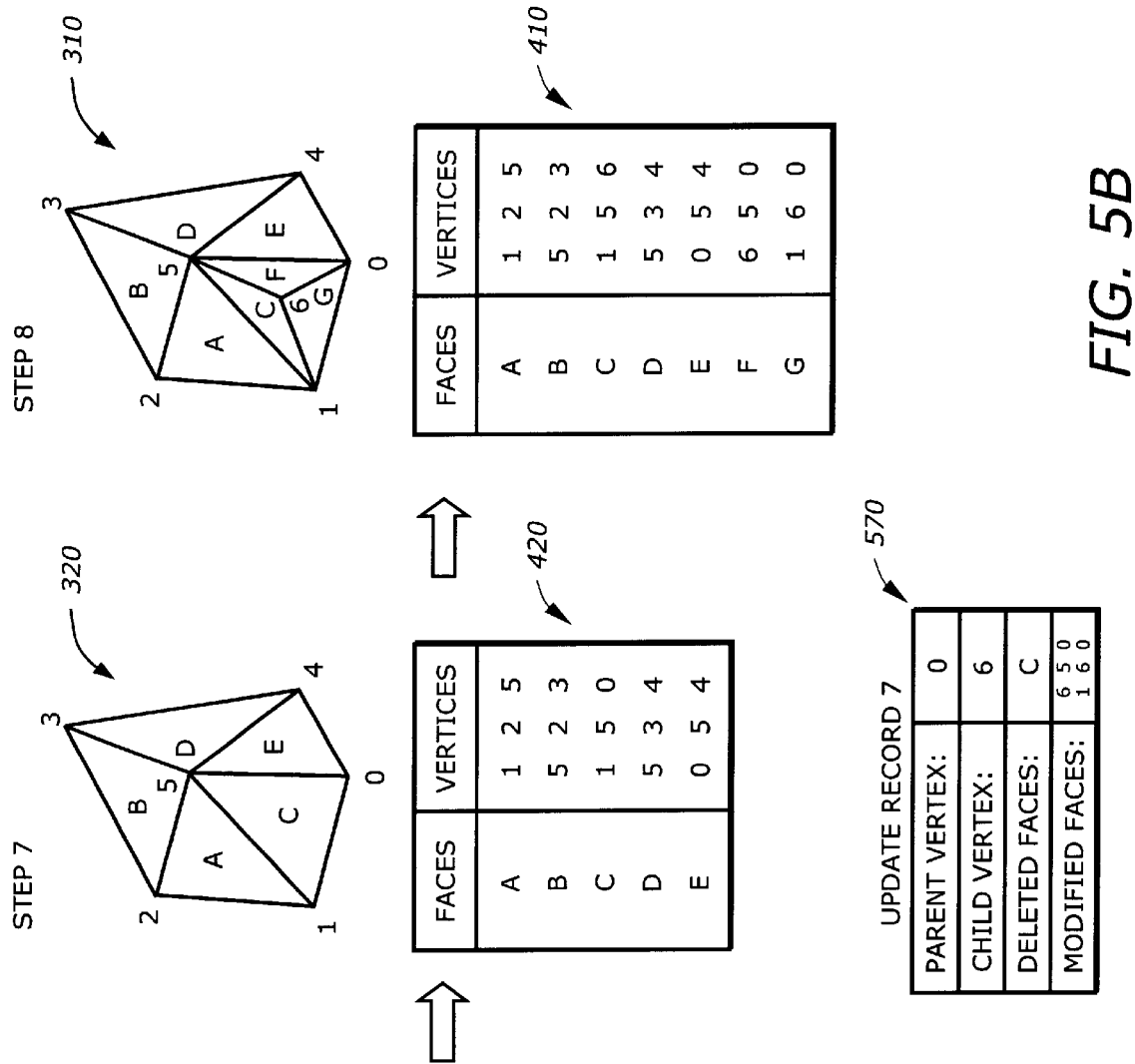
FIG. 5B is a diagram illustrating operational acts 7 and 8 in a mesh building sequence according to one embodiment of the invention.

FIG. 5B is a diagram illustrating acts 7 and 8 in a mesh building sequence 500 according to one embodiment of the invention. Act 7 includes an update record 570.

In act 7, the object 320 is constructed. The table 420 shows faces a, b, c, d, and e, which are formed by vertices <1, 2, 5>, <5, 2, 3>, <1, 5, 0>, <5, 3, 4>, and <0, 5, 4>, respectively. The update record 570, update record 7 (UR7), shows parent vertex 4, child vertex 6, modified face c, and new faces formed by vertices <6, 5, 0> and <1, 6, 0>.

In act 8, the object 310 is constructed. The table 410 shows faces a, b, c, d, e, f, and g, which are formed by vertices <1, 2, 5>, <5, 2, 3>, <1, 5, 6>, <5, 3, 4>, <0, 5, 4>, <6, 5, 0>, and <1, 6, 0>, respectively. There is no update record because this is the last act of the sequence and the object 310 is the final object of the mesh building sequence.

Face Ordering

Every new face contains exactly one parent vertex, one child vertex, and one other vertex. If the order of the vertices is not important, then specifying the other vertex would be sufficient. However, for surface rendering, order of the vertices is necessary to indicate which direction the face is pointing to. Knowing the normal vector associated with a face provides information to perform various surface rendering operations such as shading or texture filling. The face normal is a normalized vector that is perpendicular to the face.

The face ordering scheme is based on the right-hand rule. Using the right hand, when the fingers are curled in the order of the vertices, the thumb points to the direction of the normal vector. In the following, for clarity, the face has a horizontal surface, then the normal vector will be either pointing downward or upward depending on the order of the vertices. If the order of the vertices of a face is along the right hand, or clockwise, then the face normal vector is pointing downward; otherwise, the face normal vector is pointing upward. The representation therefore has additional information about the face order.

Property 3: New face(s) can be fully specified with only a parent vertex index, a child vertex index, one other vertex index, and one of the following symbols to define the face order: "parent-child", "child-parent", "both", and "n parent-child/ n child-parent" followed by two unsigned integer values.

Figure 6:
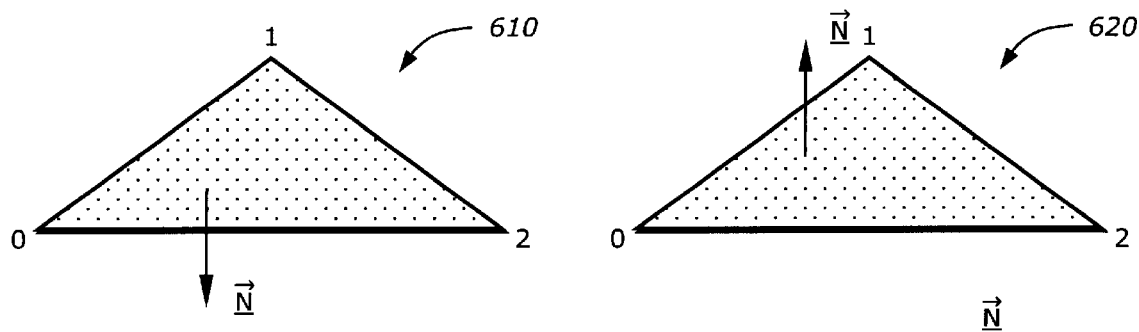
FIG. 6 is a diagram illustrating a face ordering scheme according to one embodiment of the invention.
Figure 6:
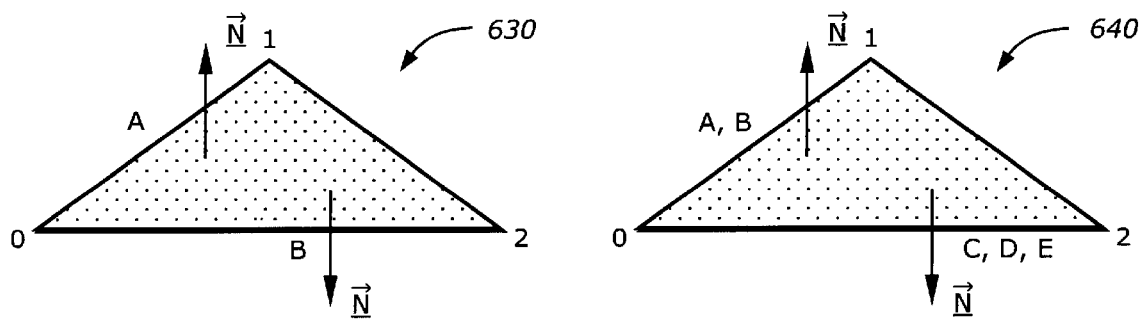

FIG. 6 is a diagram illustrating a face ordering scheme 600 according to one embodiment of the invention. The face ordering scheme 600 includes face orderings 610, 620, 630, and 640.

The face ordering 610 includes the orderings <0, 1, 2>, <1, 2, 0>, and <2, 0, 1>. Since the ordering is along the right hand, or clockwise, the face has a face normal pointing downward. The orderings <1, 2, 0> and <2, 0, 1> have the same relative ordering as the ordering <0, 1, 2>.

The face ordering 620 includes the orderings <0, 2, 1>, <1, 0, 2>, and <2, 1, 0>. Since the ordering is along the left hand, or counter clockwise, the face has a face normal pointing upward. The orderings <1, 0, 2> and <2, 1, 0> have the same relative ordering as the ordering <0, 2, 1>.

The face ordering 630 corresponds to two faces a and b. Face a has the ordering <0, 2, 1> with a face normal pointing upward. Face b has the ordering <0, 1, 2> with a face normal pointing downward. If this face was added with the parent vertex 0 and the child vertex 2 and the other vertex 1, then face a is specified using a parent-child symbol. Face b is specified using a child-parent symbol because the vertices can be rotated (not changing the relative order) until the parent vertex and the child vertex are adjacent. In this example, vertices <1, 2, 0> are the same as face b, and the child-parent order is obvious. For double-sided faces, instead of specifying two symbols "child-parent" and "parent-child", a single symbol "both" is used.

The face ordering 640 represents a new face with multiple instances (0-n) of each side. The face ordering 640 corresponds to five faces a, b, c, d, and e. Faces a and b have the ordering <0, 2, 1> with a face normal pointing upward. Faces c, d, and e have the ordering <0, 1, 2> with a face normal pointing downward. For this case, a symbol "n-child-parent/ n-parent-child" followed by the number of child-parent faces and the number of parent-child faces is used. This symbol is used for compression purposes.

Efficient Representation of Connectivity Information

Let "m" be the number of vertices in the current mesh and "n" is the number of faces. The update record can be concisely represented using an efficient encoding scheme. The encoding scheme is based on the following.

Parent vertex: The parent vertex is encoded as an index into the table of vertices. The index is encoded using unsigned binary number using ceiling$\{\log_2 m\}$ bits, where ceiling$\{x\}$ is an opreration to round up x to the next whole number.

Child vertex: The child vertex is not encoded because it is always the next vertex index, or m.

Modified faces: All the faces that contain the parent index in the order they are found in the face table are enumerated. The enumeration is performed by a state machine. A single bit is used to indicate if a face is modified. If this bit is at a first logical state (e.g., 0) then the face is not modified. If this bit is at a second logical state (e.g., 1) then the face is modified.

Figure 8:
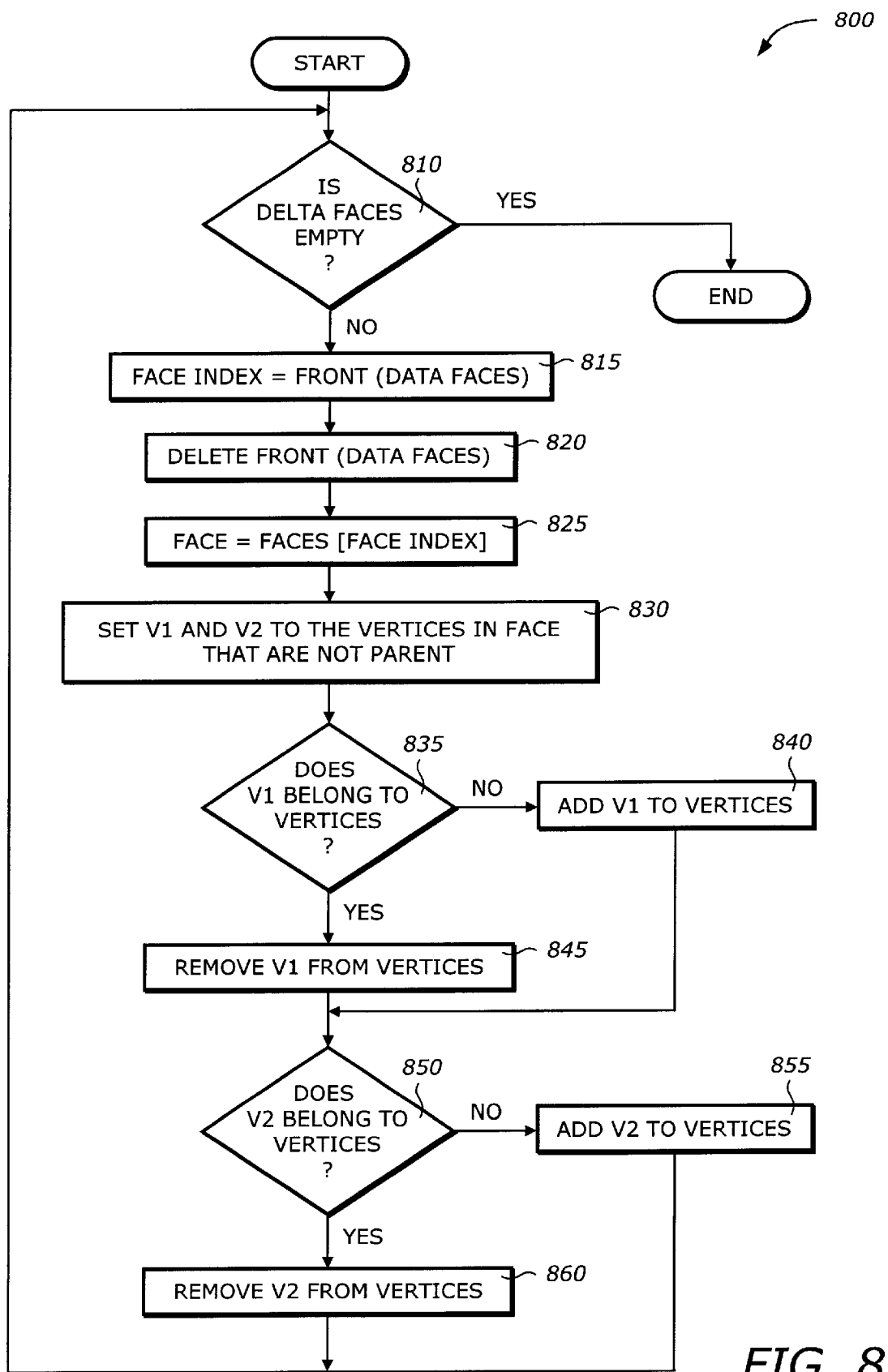
FIG. 8 is a flowchart illustrating an algorithm to determine a manifold flag according to one embodiment of the invention.

New faces: Since all new faces contain a parent vertex, a child vertex, and one other vertex, it is necessary to enumerate all of the other vertices that are connected to the parent vertex. The enumeration is performed by a state machine. The order is determined by the order in which they are found in the face table. As an optimization, a single manifold bit is used to indicate whether the new faces are manifold topology (i.e., an edge belongs to at most two faces). If the manifold bit is 1 then only a subset o the enumeration is used. The enumeration is pruned to include only the subset. FIG. 8 shows an algorithm that construct this subset. To handle exceptions where the new faces contain other vertices that are not in the enumeration, like in the starting of a new mesh, a single exception bit is used to indicate that a single value is to be added to the enumeration. If this bit is equal to 1, then the value follows. The value is encoded using ceiling$\{\log 2\ m\}$ bits. If the manifold bit was set to indicate only the subset of vertices in the enumeration that construct manifold topology are to be used, then there will not be any exceptions and the exception bit is not encoded. A single bit for each value in the enumeration is encoded to indicate that a new face is constructed with this index value.

Face order: The face order is encoded for each new face using the symbols in Property 3 described above. Two bits are used to encode the symbol and additional bits are used if the symbol is "n-parent-child/ n-child-parent".

Figure 7:
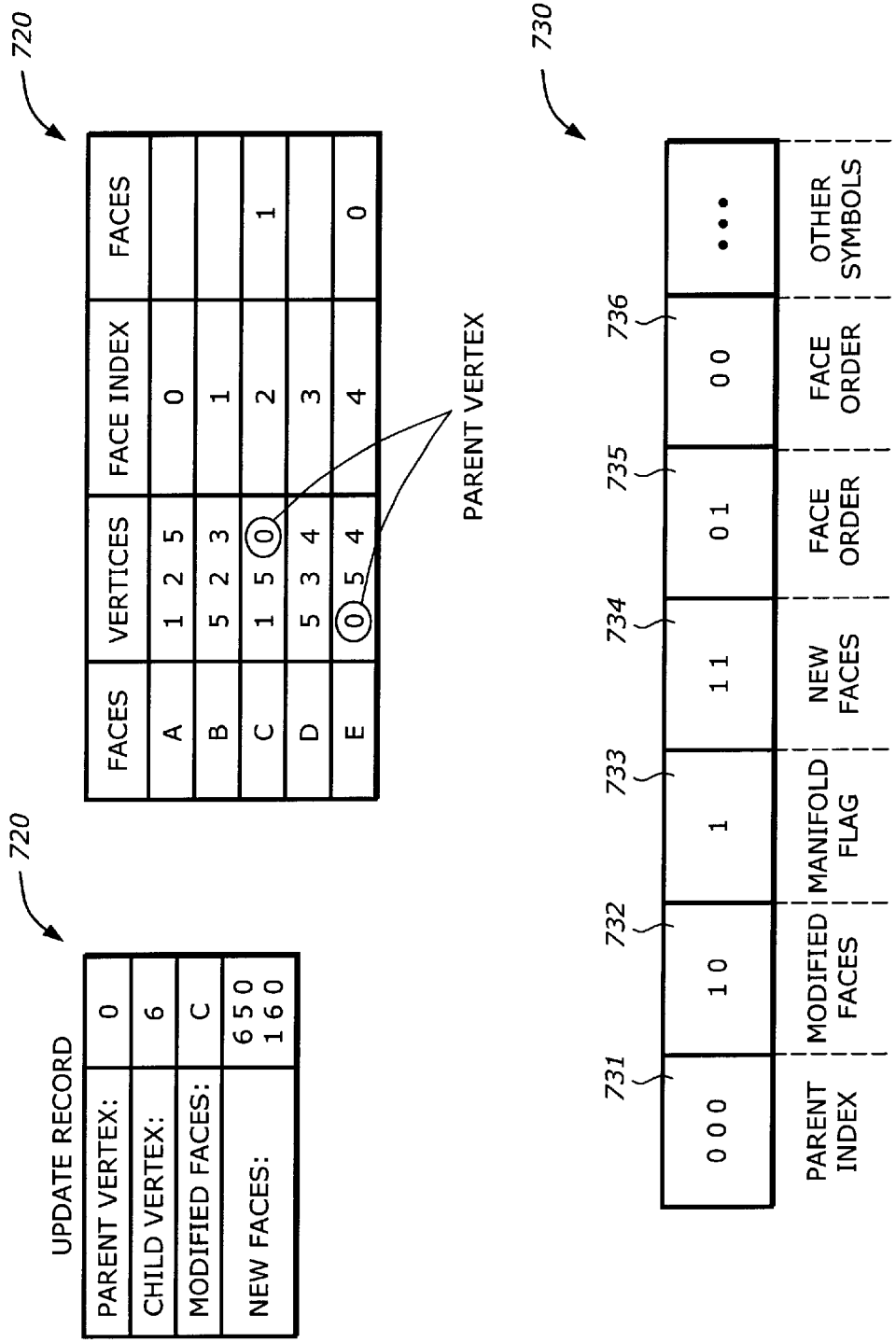
FIG. 7 is a diagram illustrating a representation of connectivity according to one embodiment of the invention.

FIG. 7 is a diagram illustrating a representation of connectivity according to one embodiment of the invention. The representation uses the update record 570 and builds a table 720 and an encoding 730.

The update record 570 shows a parent vertex 0, a child vertex 6, a modified face c, and new faces <6, 5, 0> and <1, 6, 0> as shown in FIG. 5. The table 720 expands the face/vertices table to include the encodings. The table 720 includes a face index column that shows the face indices. Since there are 6 vertices, m=6, [log2 m]=3 bits, so the parent vertex is encoded using three bits as 000. The parent vertex 0 involves in faces c and e. Face c is modified, so the modified bit is set to 1 for face c. Face e is not modified, so the modified bit is reset to 0 for face e. The encoded bits are therefore 10.

The encoding 730 has a parent index field 731, a modified faces field 732, a manifold flag field 733, a new faces field 734, a first face order field 735, and a second face order field 736.

The parent index field 731 contains the encoded parent index 000. The modified faces field 732 contains the encoded bits 10 for faces c and e. The manifold flag field 733 is 1. Since the manifold flag is 1, no exception bits are encoded. Using a manifold vertices algorithm, which is described later, the list of manifold vertices determined by a state machine is 1, 5. Since the new faces are <6, 5, 0> and <1, 6, 0>, the manifold flag bit is encoded 1. Since 1 and 5 are used in the new faces, the new faces are encoded as 11 as shown in the new faces field 734. The first and second face order fields 735 and 736 correspond to the new faces <1, 6, 0> and <6, 5, 0>, respectively. The new face <1, 6, 0> is in "child-parent" order, therefore the encoded face order is 01. The new face <6, 5, 0> is in "parent-child" order, therefore the encoded face order is 00.

FIG. 8 is a flowchart illustrating a process 800 to determine a manifold subset of the enumeration according to one embodiment of the invention. The manifold flag is set to 1 if all the new faces are constructed using vertices from the manifold subset.

The data structures for the process 800 are: Parent Index (the parent index), DeltaFaces (the list of indices of modified faces), Vertices (the empty list to hold enumerated manifold vertices), Faces (the face table), Front (the first value of the stack).

Upon START, the process 800 determines if DeltaFaces is empty (block 810). If DeltaFaces is empty, the process 800 is terminated. Otherwise, the process 800 sets the Face Index to the Front (DeltaFaces) (block 815). Then the process 800 deletes the Front (DeltaFaces) (block 820), and then sets Face to Face (Face Index) (block 825).

Next, the process 800 sets V1 and V2 to the vertices in face that are not parent vertices (block 830). The process 800 then determines if V1 belongs to Vertices. If NO, V1 is added to Vertices (block 840) and the process 800 proceeds to block 850. If YES, V1 is removed from Vertices (block 845) and the process 800 goes to block 850.

In block 850, the process 800 determines if V2 belongs to Vertices. If NO, V2 is added to Vertices (block 855) and the process 800 goes back to block 810. If YES, V2 is removed from Vertices and the process 800 goes back to block 810.

In the example shown in FIG. 7, the data structures are determined as follows:

DeltaFaces=2 (index of the modified face c into the table of faces). Face=<1, 5, 0>. The parent index is 0 so V1 is set to 1 and V2 is set to 5. V1 and V2 are then added to Vertices. There are no more elements in DeltaFaces, so the process ends. Thus the list of the manifold vertices is 1 and 5.

Figure 9:
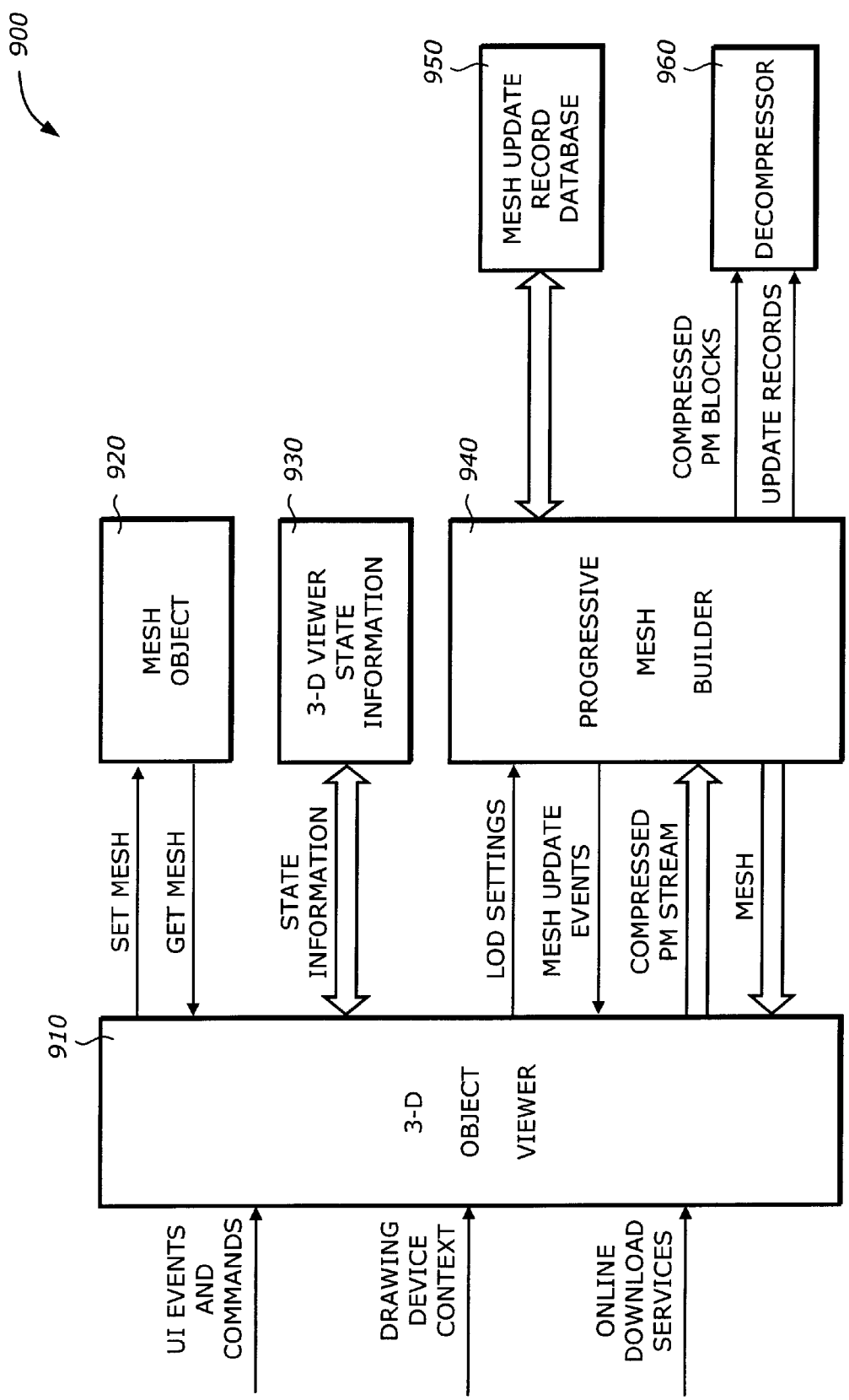
FIG. 9 is a diagram illustrating an architecture of an on-line media browser according to one embodiment of the invention.

FIG. 9 is a diagram illustrating an architecture of an on-line media browser 900 according to one embodiment of the invention. The browser 900 includes a 3-D object viewer 910, a mesh object 920, a 3-D viewer state information 930, a progressive mesh builder 940, a mesh update record database 950, and a decompressor 960.

The 3-D object viewer 910 provides a display of the 3-D object modeled by the progressive meshes. The 3-D object viewer 910 receives the users interface (UI) events and commands, the drawing device context, and the on-line download services. The mesh object 920 performs rendering of the 3-D object to be displayed. The operations performed by the mesh object 920 include determination of textures in display format, calculation of the normal vectors, and formatting for fast viewing. The mesh object 920 send s requests for mesh information to the 3-D object viewer 910 and obtains the meshes from the 3-D object viewer 910.

The 3-D state information 930 stores information on the state of the 3-D viewing. The information includes the current viewing frustum, data entry device state (e.g., mouse, tablet digitizer). The 3-D state information 930 exchanges information with the 3-D object viewer.

The Progressive Mesh Builder 940 receives the compressed progressive mesh stream and the level of detail (LOD) settings from the 3-D Object Viewer 910, and builds up the meshes. The Progressive Mesh Builder 940 generates the mesh update events and the meshes to be sent to the 3-D Object Viewer 910. The Progressive Mesh Builder 940 also receives the update records from the decompressor 960 and transfer the compressed progressive meshes blocks to the decompressor 960.

The mesh update record database 950 stores the update records as generated by the decompressor 960. The update records provide the data structures and connectivity information for the Progressive Mesh Builder 940 to build the meshes.

The decompressor 960 receives the compressed progressive meshes blocks from the Progressive Mesh Builder 940 and decodes the received progressive meshes stream.

Figure 10:
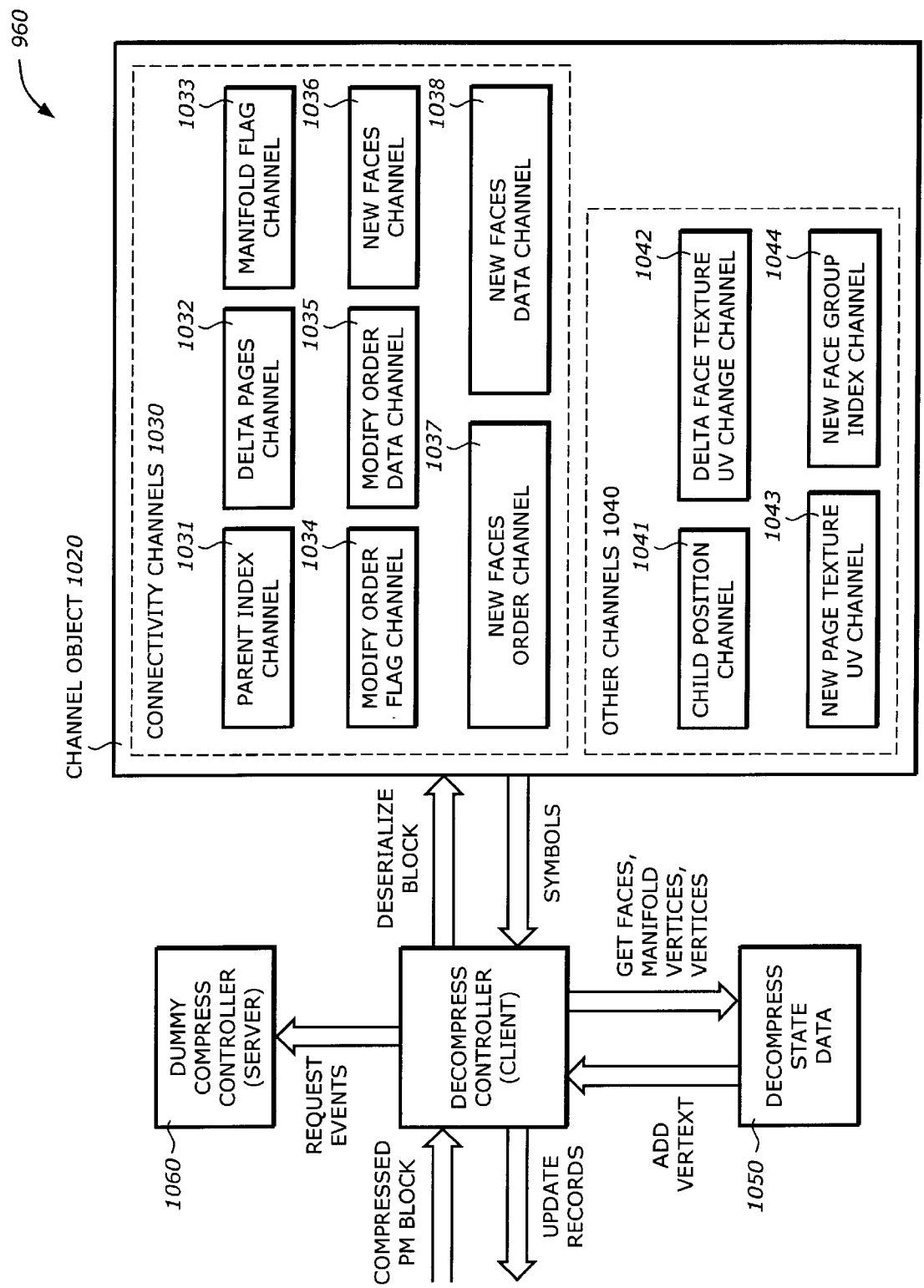
FIG. 10 is a diagram illustrating decompressor according to one embodiment of the invention.

FIG. 10 is a diagram illustrating a decompressor 960 according to one embodiment of the invention. The compressor 960 includes a decompress controller 1010, a channel object 1020, a decompress state data object 1050, and a compress controller 1060.

The decompress controller 1010 acts as an interface between the processing modules in the channel structure 1020 and the Progressive Mesh Builder 940. The decompress controller 1010 receives the compressed progressive mesh blocks from the Progressive Mesh Builder 940 and forwards the blocks to the individual channels or modules for processing by deserializing the progressive mesh stream into appropriate channels. The decompress controller 1010 then receives the symbols as generated by the channel structure 1020. The decompress controller 1010 then uses the information from the internal mesh stored in the decompress state data object 1050 to decode the symbols to build an update record. The decompress controller 1010 then formats and organizes the update records and sends the update records to the Progressive Mesh Builder 940. The decompress controller 1010 receives internal mesh information from the decompress state data object 1050 including faces, manifold vertices and vertices information.

The channel object 1020 includes connectivity channels object 1030 and other channels object 1040. Connectivity channels object 1030 includes parent index channel 1031, delta faces channel 1032, manifold flag channel 1033, modify order flag channel 1034, modify order data channel 1035, new faces channel 1036, new faces order channel 1037, and new faces data channel 1038. These channels are processing modules that receive the corresponding deserialized blocks and generate the appropriate symbols according to the algorithm described above. Other channels object 1040 includes child position channel 1041, delta face texture UV change channel 1042, new face texture UV channel 1043, and new face group index channel 1044. These channels perform additional tasks for the rendering of the surfaces as generated by the progressive mesh builder 940.

The decompress state data object 1050 stores the information about the current state of the decompressor 960. The decompress state data object 1050 maintains an internal representation of the meshes as generated up to the current time. The decompress state data object 1050 allows the detailed information about the mesh to be gathered.

In one embodiment, the compress controller 1060 is a dummy processing module to receive the event requests from the decompress controller 1010. The requests are ignored because the data is already ordered and in the channel object queues. This is because the exact same decompress controller is used in the compressor module where these requests actually compile data and fill up the channels.

Figure 11:
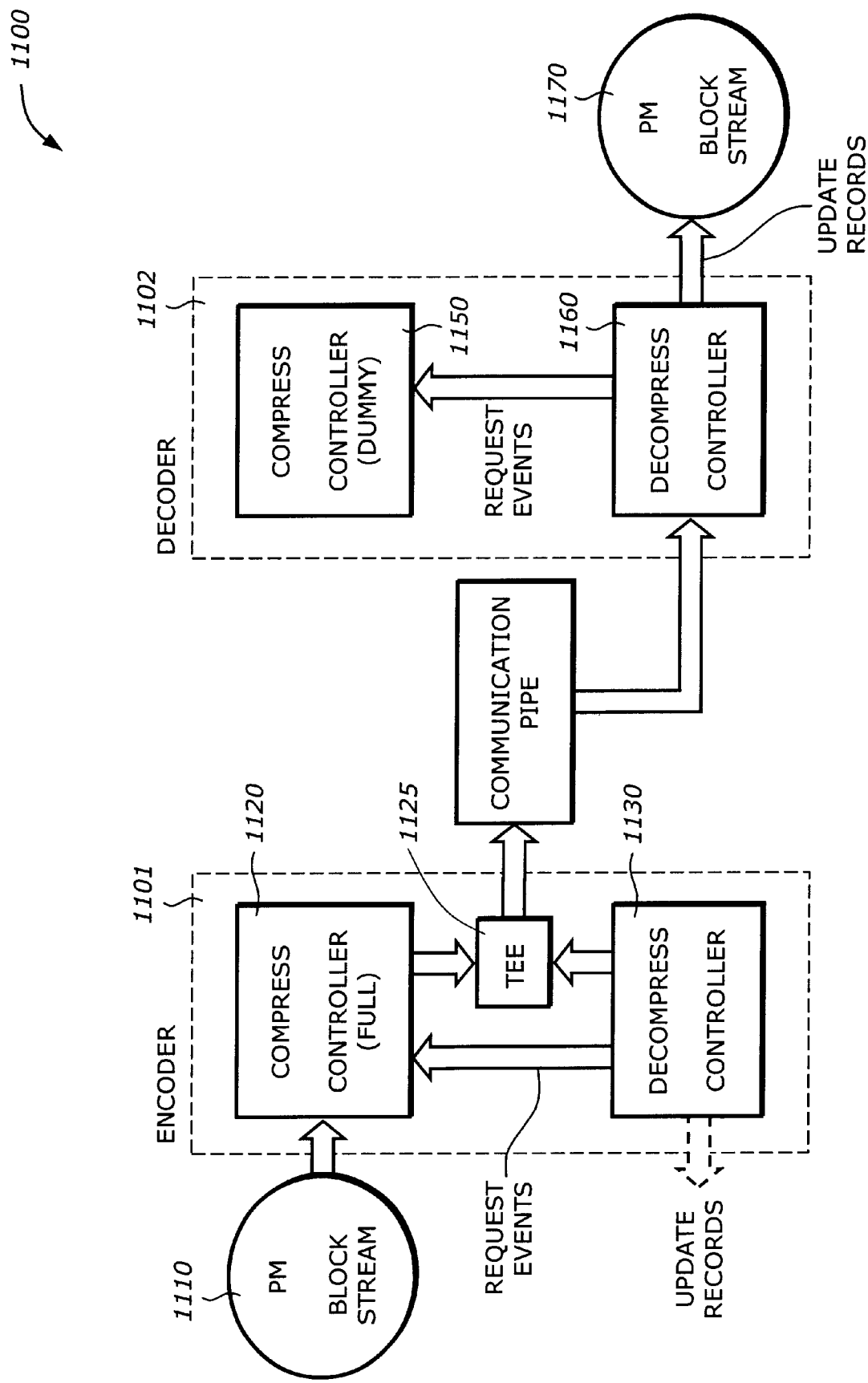
FIG. 11 is a diagram illustrating a system for processing the progressive meshes according to one embodiment of the invention.

FIG. 11 is a diagram illustrating a system 1100 for processing the progressive meshes according to one embodiment of the invention. The system 1100 includes a PM block stream 1110, an encoder 1101, a communication pipe 1145, a decoder 1102, and a PM block stream 1170.

The PM block stream 1110 includes a sequence of PM blocks that represent the object to be encoded. The encoder 1101 encodes the PM blocks into symbols in the PM block stream 1110. The communication pipe 1145 is a conduit to transfer the encoded PM blocks to the decoder 1102. The communication pipe 1145 may be system files in a database, or may be a network channel like the Internet. The decoder 1102 receives the symbols representing the PM blocks and decodes the symbols to the PM block stream 1170. The PM block stream 1170 represents the sequence of the PM to be displayed.

The encoder 1120 and the decoder 1102 have similar architectures. In one embodiment, the encoder 1120 and the decoder 1102 share the same elements. This sharing results in significant efficiency in program storage. The encoder 1101 includes a compress controller 1120, an tee structure 1125, and a decompress controller 1130. The compress controller 1120 is a full compressor that performs symbol encoding on the received PM blocks using the connectivity representation described above. The tee 1125 stores the connectivity channels and other channels and appropriate interface to the communication pipe 1145 and the decompress controller 1130. The decompressor controller 1130 generates the update records for the encoded symbols, but the generated update records are ignored.

The decoder 1102 includes a compress controller 1150 and a decompress controller 1160. The decompress controller 1160 receives the encoded symbols representing the PM blocks. The decompress controller 1160 uses a symbol decoding table to translate the encoded symbols to the appropriate format. The decompress controller 1160 sends even requests to the compress controller 1150.

The compress controller 1150 is a dummy compress controller because the decoder 1102 shares the same elements as the decoder 1101. The compress controller 1150 ignores the requests.

Channels

There are several channels that are used during the encoding process. Each channel is designed to store similar information (values with the same symbol set, same range, boolean values, etc . . . ). For example, the manifold flag uses the symbols MANIFOLD and NON_MANIFOLD, so there is a ManifoldFlagChannel that stores all the flags for the entire Progressive Mesh (PM). The parent vertex index is a value encoded in the range [0 . . . ceiling(logBase2 m)], where m is the number of vertices in the PM at the moment this value is encoded. Since the range varies, a dynamic channel is used to encode these values. A dynamic channel is simply a channel whose number of symbols is determined by the current state of the state machine. In one embodiment, the list of the channels includes:

| Channel Type | Channel Name |
| --- | --- |
| DynamicSizeChannel | parentIndex |
| Symbols | deltaFaces |
| Symbols | manifoldFlag |
| Symbols | modifyOrderFlag |
| DynamicSizeChannel | modifyOrderData |
| Symbols | newFaces |
| Symbols | newFacesOrder |
| DynamicSizeChannel | newFacesData | parentIndex: <values in range [0 . . . ceiling(logBase2 m)]>
deltaFaces symbols: NO_MODIFY=0; MODIFY=1;
manifoldFlag Symbols: MANIFOLD=0; NON_MANIFOLD=1;
modifyOrderFlag Symbols:

NO_NEW_VERTEX=0; NEW_VERTEX=1;
modifyOrderData: <values ins range [0 . . . ceiling(logBase2 m)]>
newFaces Symbols:
NO_NEW_FACE=0; NEW_FACE=1;
newFacesOrder Symbols:
PREDICT_GOOD=0; PREDICT_FAIL=1;
newFacesData Symbols:
PARENT_CHILD=0;
CHILD_PARENT=1;

BOTH_DIRECTIONS=2;
MULTIPLE_FACES=3;

Description of Exception Bit/Values in the New Face Encoding

These values are encoded in the modifyOrderFlag and modifyOrderData channels (and only if manifoldFlag is equal to NON_MANIFOLD).

EXAMPLE 1

An update record that has 3 new faces, each is constructed with an other vertex that is not connected to the parent in any way. Let these other vertex values be 7, 12, and 14. Let m =32 to represent 32 vertices in the PM at this update record. The encodings include:

1) encode a NON_MANIFOLD symbol in the manifoldFlag channel.
2) encode a NEW_VERTEX symbol in the modifyOrderFlag channel.
3) encode binary 00111 (7 using 5 bits) in the modifyOrderData channel.
4) encode a NEW_VERTEX symbol in the modifyOrderFlag channel.
5) encode binary 01100 (12 using 5 bits) in the modifyOrderData channel.
6) encode a NEW_VERTEX symbol in the modifyOrderFlag channel.
7) encode binary 01110 (14 using 5 bits) in the modifyOrderData channel.
8) encode a NO_NEW_VERTEX symbol in the modifyOrderFlag channel.

A NO_NEW_VERTEX symbol is used as a delimiter to indicate the end.

EXAMPLE 2

An update record that has 3 new faces (non-manifold), each constructed with an other vertex that is connected to the parent. In other words, no exception values are needed. The encodings include:

1) encode a NON_MANIFOLD symbol in the manifoldFlag channel.
2) encode a NO_NEW_VERTEX symbol in the modifyOrderFlag channel.

A NO_NEW_VERTEX symbol is used if there are non-manifold faces (to indicate the end).

Face Order Prediction

The face order of a new face is predicted based on the face order of any adjacent faces. For example, if a new face is added that is adjacent to a modified face (already in the mesh), then the face order of the adjacent face is determined, reversed, and used as a predictor of the face order of the new face. This prediction is generated by a state machine. A symbol is encoded in the newFacesOrder channel (either PREDICT_GOOD or PREDICT_FAIL) to indicate if the prediction is correct. If the prediction is correct, then no symbols are encoded in the newFacesData. If the prediction is not correct then appropriate symbols are encoded in the newFacesData channel.

The following is the pseudo-code for the predicting face order a single new face:

```
//
// IN: parentIndex is the parent index value.
// IN: otherIndex is the other index value used in the
//         construction of the new face.
// IN: facesAroundParent is the list of faces that include the
//             parent index
// OUT: predict is one of the newFacesData symbols:
//   PARENT_CHILD
//   CHILD_PARENT
//   BOTH_DIRECTIONS
//   MULTIPLE_FACES
//
PredictFaceOrder(parentIndex,
        otherIndex,
        facesAroundParent,
        faceOrder,
        predict)
{
    predict = NONE;
    while (facesAroundParent is not empty)
    {
            faceIndex = Front(facesAroundParent)
            DeleteFront(facesAroundParent)
            face = faces[faceIndex]
        // Check if face shares edge with new face
        if (parentIndex <IsElementOf> face &&
                otherIndex <IsElementOf> face)
        {
          // FaceOrder determines ordering of adjacent face
                // and sets "order" with correct symbol
            order = NONE;
            FaceOrder(parentIndex, otherIndex, face, order);
          // reverse the order
          if (order == PARENT_CHILD)
            order = CHILD_PARENT;
          else
          {
            order = PARENT_CHILD;
          }
          // make prediction
          if (predict == NONE)
             predict = order;
          else if (predict != order)
          {
             predict = BOTH_DIRECTIONS;
             break; // leave the while loop
          }
        }
    }
        // Not enough info to predict; we make a guess
    if (predict == NONE)
        predict = PARENT_CHILD;
}
```

The following is the pseudo code for the Decompress Controller. In the following description, the "//" indicates comment, and the "a->b( )" notation indicates procedure b called from object a.

```
// Object: DecompressController
// Get a single update record
void GetSingleUpdateRecord( )
{
    // Define common variables and vectors
    U8 symbol;     // unsigned 8-bit integer to store a symbol
    bool ret;   // boolean to store return value
    CU32Vector::iterator pos;    // pos is a pointer into an
                                 // array of unsigned 32-bit
                                 // integers (U32)
    // Call BeginUpdateRecord on CompressorController to allow
    // compressor to prepare next update record.
    m_compController->BeginUpdateRecord( );
///////////////////////////////////////////////////
// child index
///////////////////////////////////////////////////
//
// Get child index from state machine (object m_mesh)
//
U32 numVertices = m_mesh.GetNumVertices( );
    //
    // The current child index is the next available index
    //
```

-continued

```
U32 childIdx = numVertices;
//////////////////////////////////////////////
// parent index
//////////////////////////////////////////////
        //
        // Send message to compress controller requesting parent index
        //
m__compController->RequestParentIdx( );
//
// Call ReadFront to obtain the parent index from channel object.
//
// NOTE: child can have himself as parent (disconnected mesh)
m__channels.m__parentIndex->ReadFront(numVertices, parentIdx);
//////////////////////////////////////////////
// delta faces
//////////////////////////////////////////////
CU32Vector faceOrder;          // empty list of U32
CU32Vector faceOrderTags;      // empty list of U32
        //
        // Request from state machine all faces that contain
        // the parent index. This list is store in faceOrder.
        //
m__mesh.GetFaces(parentIdx, faceOrder, faceOrderTags);
//
// Request delta faces
//
m__compController->RequestDeltaFaces(faceOrderTags);
// Build list of delta faces
CU32Vector deltaFaces;         // empty list of U32
        //
        // For each element in faceOrder read a symbol from
        // the delta faces channel.
        //
for (pos = faceOrder.begin( ); pos != faceOrder.end( ); ++pos)
{
                // Read symbol from delta faces channel
        m__channels.m__connDeltaFaces->ReadFront(symbol);
        // symbol == MODIFY || symbol == NO__MODIFY
        if (symbol == MODIFY)
                {
                        // Add this element in faceOrder to the deltaFaces list
                deltaFaces.push__back(*pos);
                }
}
//////////////////////////////////////////////
// manifold flag
//////////////////////////////////////////////
U8 manifoldFlag;               // stores the manifold flag
CU32Vector vertexOrder;        // empty list of U32
        //
        // Request from state machine all vertices that construct
        // manifold new faces. This list is stored in vertexOrder.
        //
m__mesh.GetManifoldVertices(parentIdx, deltaFaces, vertexOrder);
//
// Request manifold flag from compress controller
//
m__compController->RequestManifoldFlag(vertexOrder);
        // Read symbol from manifold flag channel
m__channels.m__connManifoldFlag->ReadFront(manifoldFlag);
// manifoldFlag == NON__MANIFOLD || manifoldFlag == MANIFOLD
//////////////////////////////////////////////
// modify order
//////////////////////////////////////////////
//
// Request modify order
//
if (manifoldFlag == NON__MANIFOLD)
{
                //
                // Request from state machine all vertices in faces that
                // contain the parent index. This list is stored in vertexOrder.
                //
        m__mesh.GetVertices(parentIdx, vertexOrder);
                // send request
        m__compController->RequestModifyOrder(vertexOrder);
        // Add vertices to list
        U8 otherVertexFlag;
        U32 otherVertex;
```

-continued

```
    for (;;)   // loop until break
    {
                // read symbol from modify order flag channel
        m_channels.m_connModifyOrderFlag->ReadFront(othervertexFlag);
        if (otherVertexFlag == NO_NEW_VERTEX)
        break; // leave loop
        // otherVertexFlag equals NEW_VERTEX.
            // read a vertex index from the modify order data channel.
        ret = m_channels.m_connModifyOrderData->ReadFront(numVertices,
otherVertex);
            // add this vertex to our vertexOrder list (new face enumeration)
        vertexOrder.push_back(otherVertex);
    }
 }
 //
 // Request new faces
 //
 CU32Vector newFaces;
 CU8Vector newFacesOrientation;
 CU32Vector newFacesTags;
 U32 vertex;
 U8 predictedOrder, orient;
        //
        // Loop through each vertex in vertexOrder list (new face
enumeration)
        // and request symbols from the compress controller.
        //
    for (pos = vertexOrder.begin( ); pos != vertexOrder.end( ); ++pos)
    {
            // Get current vertex in enumeration and store in "vertex"
        vertex = *pos;
            // Request a new face symbol for this vertex
        m_compController->RequestNewFaces(vertex);
            // Read new face symbol from new face channel
        m_channels.m_connNewFaces->ReadFront(symbol);
    // symbol == NEW_FACE || symbol == NO_NEW_FACE
    if (symbol == NEW_FACE)
    {
                // Predict face order
        PredictFaceOrder(parentIdx, vertex, deltaFaces, faceOrder,
predictedOrder);
                // Request a new face order symbol
        m_compController->RequestNewFacesOrder(vertex, predictedOrder,
newFacesTags);
        m_channels.m_connNewFacesOrder->ReadFront(symbol);
    // symbol == PREDICT_GOOD || symbol == PREDICT_FAIL
        if (symbol == PREDICT_GOOD)
        {
        orient = predictedOrder;   // orientation was predicted correctly
        }
        else
        {
                    // Orientation was not predicted correctly. Request
                    // explicit symbol to indicate face order. Symbol
                    // is encoded with 3 bits and stored in orient.
        m_channels.m_connNewFacesData->ReadFront(3, orient);
        // orient == PARENT_CHILD || orient == CHILD_PARENT ||
        // orient == BOTH_DIRECTIONS || orient == MULTIPLE_FACES
    }
        if (orient == PARENT_CHILD || orient == CHILD_PARENT)
        {
          newFaces.push_back(vertex);
          newFacesOrientation.push_back(orient);
        }
        else if (orient == BOTH_DIRECTIONS)
        {
          newFaces.push_back(vertex);
          newFaces.push_back(vertex);
          newFacesOrientation.push_back(PARENT_CHILD);
          newFacesOrientation.push_back(CHILD_PARENT);
        }
        else if (orient == MULTIPLE_FACES)
        {
          U32 count;
                    // Read 4 bits from the new faces data channel
                    // for the count of PARENT_CHILD faces.
          m_channels.m_connNewFacesData->ReadFront(4, count);
          for (int i = 0; i < count; ++i)
```

```
            {
               newFaces.push_back(vertex);
               newFacesOrientation.push_back(PARENT_CHILD);
            }
                        // Read 4 bits from the new faces data channel
                        // for the count of CHILD_PARENT faces.
            m_channels.m_connNewFacesData->ReadFront(4, count);
            for (i = 0; i < count; ++i)
            {
               newFaces.push_back(vertex);
               newFacesOrientation.push_back(CHILD_PARENT);
            }
         }
      }
   }
}
```

Therefore, the present invention is a technique to represent connectivity information of progressive meshes using pair-contraction. The connectivity information is based on the parent-child inheritance properties. Using these properties, the connectivity information is encoded efficiently into symbols and update records for building progressive meshes. The technique reduces data storage and processing time significantly.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    encoding a parent vertex in N vertices of an object, the parent vertex being used in a pair-contracting operation, the pair-contracting operation moving a child vertex to the parent vertex; and
    encoding a symbol of a connectivity related to the parent vertex.

2. The method of claim 1 further comprising:
    creating an update record containing the symbol.

3. The method of claim 1 wherein encoding the parent vertex comprises encoding a parent index by an N-bit binary field.

4. The method of claim 1 wherein the symbol corresponds to one of a modified face symbol, a new face symbol, a new face order symbol, a new face data symbol, a manifold flag symbol, a modify order flag symbol, and a modify order data symbol.

5. The method of claim 4 wherein the modified face symbol encodes a face having the parent vertex.

6. The method of claim 5 wherein the modified face symbol includes a modify bit, the modify bit being in a first logical state when the face is modified and in a second logic state when the face is unmodified.

7. The method of claim 4 wherein the new face symbol encodes a new face having the parent vertex and one other vertex, the other vertex being one of the vertices in the modified face when the manifold flag symbol is asserted.

8. The method of claim 7 wherein the new face symbol includes a new bit, the new bit being at a first logical state when the new face contains a vertex in an enumeration, and at a second logical state otherwise.

9. The method of claim 8 wherein the manifold flag symbol includes a manifold bit, the manifold bit being at a first logical state when the new face have manifold edges, each of the manifold edges appearing in at most two faces, and at a second logical state otherwise.

10. The method of claim 4 wherein the new face data symbol encodes one of a parent-child order, a child-parent order, a dual face order, and a multiple instance order.

11. The method of claim 4 wherein the new face order symbol encodes a prediction of a face order of a new face based on a face order of any adjacent faces.

12. An apparatus comprising:
    a controller to receive compressed PM blocks from a PM builder and to send an update record to the PM builder, the controller deserializing the compressed PM blocks;
    a state object coupled to the controller to maintain a current state; and
    a channel object coupled to the controller to receive the deserialized PM blocks and to encode symbols of connectivity of objects in the deserialized PM blocks using a pair-contracting operation, the pair-contracting operation moving a child vertex to the parent vertex, the encoded symbols forming the update record.

13. The apparatus of claim 12 wherein the channel object comprises:
    a connectivity channel to represent a connectivity of an object in the pair-contracting operation, the object having N vertices.

14. The apparatus of claim 12 wherein the connectivity channel includes a parent index channel, a delta face channel, a manifold flag channel, a modify order flag channel, a modify order data channel, a new face data channel, and a new face order channel.

15. The apparatus of claim 14 wherein the parent index channel encodes a parent vertex uses a parent index from an N-bit binary field.

16. The apparatus of claim 14 wherein the delta faces channel encodes a delta faces symbol.

17. The apparatus of claim 14 wherein the modify order channel encodes a face having the parent vertex in a modified face symbol.

18. The apparatus of claim 17 wherein the modified face symbol includes a modify bit, the modify bit being in a first logical state when the face is modified and in a second logic state when the face is unmodified.

19. The apparatus of claim 14 wherein the new face channel encodes a new face created with a modified face in a new face symbol.

20. The apparatus of claim 19 wherein the new face symbol includes a new bit, the new bit being at a first logical state when the new face contains a vertex in the modified face other than the parent vertex, and at a second logical state otherwise.

21. The apparatus of claim 14 wherein the manifold flag channel generates a manifold flag symbol, the manifold flag symbol including a manifold bit, the manifold bit being at a first logical state when the new face has manifold edges, each of the manifold edges appearing in at most two faces, and at a second logical state otherwise.

22. The apparatus of claim 14 wherein the face order channel encodes one of a parent-child order, a child-parent order, a dual face order, and a multiple instance order, in a face order symbol.

23. The apparatus of claim 14 wherein the new face order symbol encodes a prediction of a face order of a new face based on a face order of any adjacent faces.

24. A system comprising:
an object viewer to display objects from a progressive mesh (PM);
a PM builder coupled to the object viewer to construct the PM and to generate compressed PM blocks;
a decompressor coupled to the PM builder to decompress the compressed PM blocks, the decompressor comprising:
a controller to receive the compressed PM blocks from the PM builder and to send an update record to the PM builder, the controller deserializing the compressed PM blocks,
a state object coupled to the controller to maintain a current state, and
a channel object coupled to the controller to receive the deserialized PM blocks and to encode symbols of connectivity of objects in the deserialized PM blocks using a pair-contracting operation, encoding a parent vertex in N vertices of an object, the parent vertex being used in a pair-contracting operation, the pair-contracting operation moving a child vertex to the parent vertex, the encoded symbols forming the update record.

25. The system of claim 24 wherein the channel object comprises:
a connectivity channel to represent a connectivity of an object in the pair-contracting operation, the object having N vertices.

26. The system of claim 24 wherein the connectivity channel wherein the connectivity channel includes a parent index channel, a delta face channel, a manifold flag channel, a modify order flag channel, a modify order data channel, a new face data channel, and a new face order channel.

27. The system of claim 25 wherein the parent index channel encodes a parent vertex uses a parent index from an N-bit binary field.

28. The system of claim 26 wherein the delta face channel encodes a delta faces symbol.

29. The system of claim 26 wherein the modify order channel encodes a face having the parent vertex in a modified face symbol.

30. The system of claim 29 wherein the modified face symbol includes a modify bit, the modify bit being in a first logical state when the face is modified and in a second logic state when the face is unmodified.

31. The system of claim 26 wherein the new face channel encodes a new face created with a modified face in a new face symbol.

32. The system of claim 31 wherein the new face symbol includes a new bit, the new bit being at a first logical state when the new face contains a vertex in the modified face other than the parent vertex, and at a second logical state otherwise.

33. The system of claim 29 wherein the manifold flag channel generates a manifold flag symbol, the manifold flag symbol including a manifold bit, the manifold bit being at a first logical state when the new face has manifold edges, each of the manifold edges appearing in at most two faces, and at a second logical state otherwise.

34. The system of claim 26 wherein the face order data channel encodes one of a parent-child order, a child-parent order, a dual face order, and a multiple instance order, in a face order symbol.

35. The system of claim 26 wherein the new face order symbol encodes a prediction of a face order of a new face based on a face order of any adjacent faces.

* * * * *

UNITED STATES PATENT AND TRADEMARK OFFICE
CERTIFICATE OF CORRECTION

PATENT NO. : 6,396,490 B1
DATED : May 28, 2002
INVENTOR(S) : Gorman

It is certified that error appears in the above-identified patent and that said Letters Patent is hereby corrected as shown below:

<u>Column 3,</u>
Line 64, delete "g1", insert -- g --.

Signed and Sealed this

Nineteenth Day of November, 2002

Attest:

JAMES E. ROGAN
*Attesting Officer*  *Director of the United States Patent and Trademark Office*